(12) United States Patent
Buer et al.

(10) Patent No.: US 9,165,163 B2
(45) Date of Patent: Oct. 20, 2015

(54) SECURE DELIVERY OF PROCESSING CODE

(71) Applicant: Broadcom Corporation, Irvine, CA (US)

(72) Inventors: Mark Buer, Payson, AZ (US); Jacob Mendel, Kibutz Givat Brenner (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/730,766

(22) Filed: Dec. 28, 2012

(65) Prior Publication Data

US 2014/0157000 A1    Jun. 5, 2014

Related U.S. Application Data

(60) Provisional application No. 61/732,215, filed on Nov. 30, 2012.

(51) Int. Cl.
| | |
|---|---|
| G06F 12/14 | (2006.01) |
| G06F 21/76 | (2013.01) |
| G06F 21/64 | (2013.01) |
| G06F 21/57 | (2013.01) |
| G06F 21/60 | (2013.01) |

(52) U.S. Cl.
CPC ............ *G06F 21/76* (2013.01); *G06F 12/1408* (2013.01); *G06F 21/57* (2013.01); *G06F 21/572* (2013.01); *G06F 21/606* (2013.01); *G06F 21/64* (2013.01); *G06F 2221/2107* (2013.01)

(58) Field of Classification Search
None
See application file for complete search history.

(56) References Cited

U.S. PATENT DOCUMENTS

| 8,108,691 B2 * | 1/2012 | Holtzman et al. ............ 713/193 |
| 8,255,700 B2 * | 8/2012 | Kitariev et al. ............... 713/189 |
| 8,527,780 B2 * | 9/2013 | Roberts et al. ............... 713/192 |
| 8,656,161 B2 * | 2/2014 | Nakae ........................... 713/168 |
| 2006/0168580 A1 * | 7/2006 | Harada et al. ................. 717/174 |
| 2009/0172401 A1 * | 7/2009 | Cizas et al. ................... 713/169 |
| 2013/0129086 A1 * | 5/2013 | Tang et al. ...................... 380/44 |
| 2013/0318357 A1 * | 11/2013 | Abraham et al. ............. 713/176 |
| 2014/0122881 A1 * | 5/2014 | Cizas et al. ................... 713/169 |

* cited by examiner

*Primary Examiner* — Gilberto Barron, Jr.
*Assistant Examiner* — Wayne An
(74) *Attorney, Agent, or Firm* — Brinks Gilson & Lione

(57) ABSTRACT

An apparatus may comprise a secure portion of a chip and an external memory device. The secure portion of the chip may be configured to receive an encryption key, and the memory device may be configured to receive an encrypted processing code. The secure portion of the chip may be configured to verify the encrypted processing code by decrypting the encrypted processing code using the encryption key. A non-secure portion of the chip may be configured to write the encrypted processing code on the memory device while the memory device is coupled to the chip. The encryption key may be associated with an identifier of the chip.

20 Claims, 4 Drawing Sheets

SECURE DELIVERY OF PROCESSING CODE

TECHNICAL FIELD

The technical field of the present disclosure relates to information security and, in particular to secure delivery of processing code.

BACKGROUND

Maintaining security in processors can be critical for various reasons. It can maintain secrecy of certain aspects of proprietary code, prevent malicious code from interfering with processing and avoid unintended interaction with other processing code.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In various embodiments, a chipset that may be used in various communication devices is provided. Chipsets may include various components, such as circuitry, memory, etc. Some chipsets may include an embedded flash memory which may be used to store various processing code, for example.

In various embodiments described herein, a chip is manufactured without an embedded flash memory. Instead, an external flash memory may be coupled to the chip subsequent to fabrication and testing of the chip.

Figure 1:
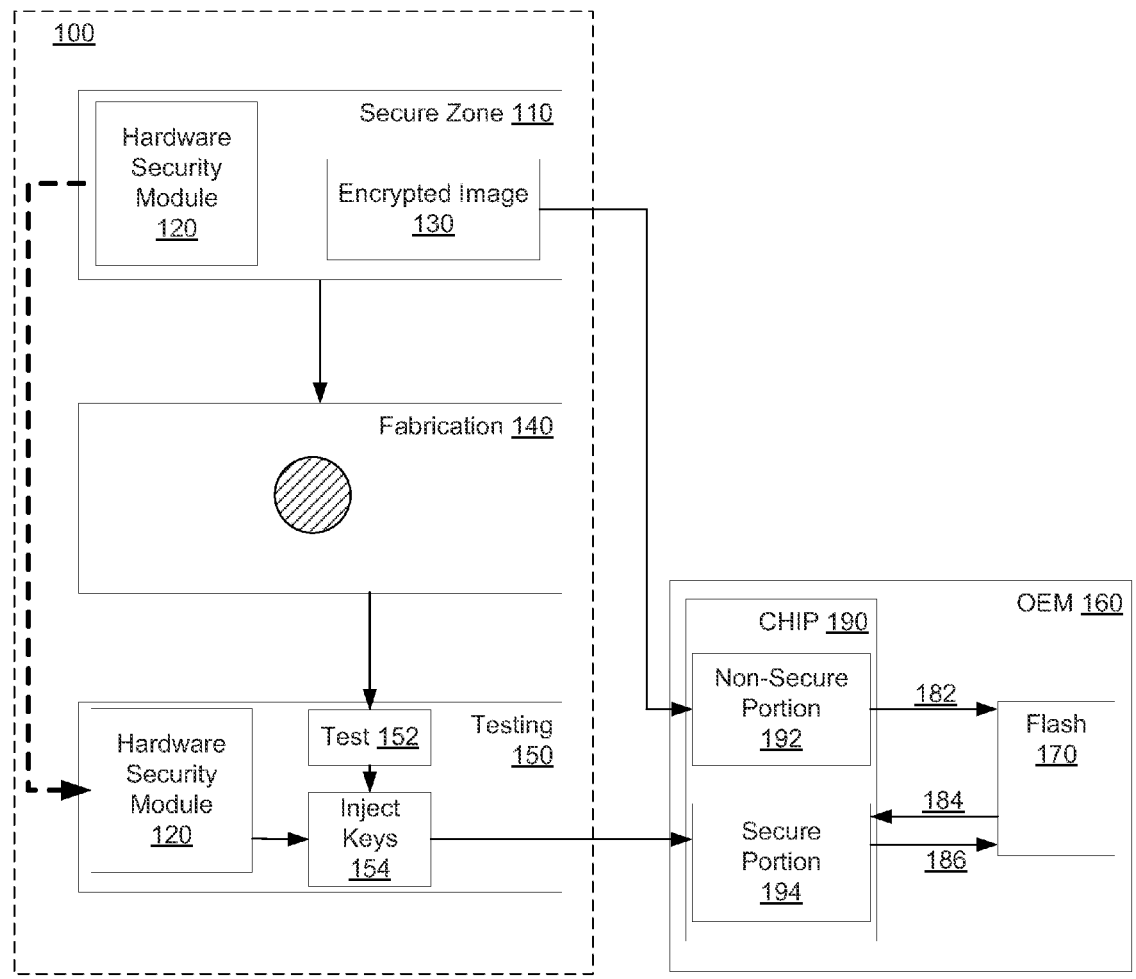
FIG. 1 is an example schematic representation of a manufacturing flow.

Referring now to FIG. 1, an example schematic representation of a manufacturing flow is illustrated. In the example of FIG. 1, a controlled or certified manufacturing flow arrangement 100 may be used to design, fabricate and test chips. The flow arrangement 100 begins with the design of the physical circuitry, processing code and other components and/or functionality in a secure zone 110. The secure zone 110 may be a physical or virtual location with access limited to certain individuals and/or entities. From the secure zone 110, the physical design of a chip may be transmitted to a fabrication facility 140. In some embodiments, the design may be transmitted via a stream of data in, for example, a graphic data system (GDS-II) format. The fabricated facility 140 may produce a wafer or chips that are then delivered to a testing facility 150. In various embodiments, the secure zone 110, fabrication facility 140 and the testing facility 150 may be remotely located or co-located.

Referring again to the secure zone 110, a secure processing code may be generated and encrypted to produce encrypted processing code, also known as an image. The encrypted image 130 may include, for example, operating system patches for customization of the destination chip or device. In various embodiments, the encrypted image 130 may also include, without limitation, customized or pre-personalized applets or confidential customer data.

In encrypting the image, various encryption strategies may be used. For example, in one embodiment, the code is encrypted using the Triple Data Encryption Standard (3DES) algorithm. In one embodiment, in order to facilitate customization or pre-personalization of a destination device, an identifier associated with a device or a set of devices may be used in the encryption process. For example, a serial number or a set of serial numbers may be used.

Referring now to the testing facility 150, as noted above, the fabricated wafers or chips are delivered to testing facility 150 from the fabrication facility 140 for testing. Additionally, a hardware security module (HSM) 120 containing certain encryption keys may be delivered to the testing facility. In this regard, the HSM 120 may be a hardware component which includes encryption keys associated with the encrypted image 130.

At the testing facility 150, the chips are tested through one or more tests 152. Upon successful completion of the testing, the HSM injects the encryption keys into the chip 154. As described below, the keys are injected into a secure portion of the chip. The chips, such as chip 190, may then be delivered to an original equipment manufacturer (OEM) 160 for implementing, for example, into a communication device.

The encrypted image 130 is typically stored on a flash memory. As noted above, in various embodiments, the chip design may not include an embedded flash memory. Accordingly, in accordance with the illustrated example of FIG. 1, the encrypted image 130 is transmitted to the OEM 160 for storage in a memory device, such as an external flash memory 170. In this regard, the flash memory 170 is external to the chip 190 provided to the OEM 160 via the manufacturing flow 100.

The chip 190 provided by the manufacturing flow 100 to the OEM 160 includes a non-secure portion 192, also referred to herein as a peripheral processing system (PPS), and a secure portion 194, also referred to herein as a secure processing system (SPS). The secure portion 194 may include functionality associated with secure processing by the chip 190. For example, as illustrated in FIG. 1, the secure portion 194 may include the encryption keys injected into the chip 190 by the HSM 120.

As illustrated in FIG. 1, the encrypted image 130 received by the OEM 160 may be written to the flash through the non-secure portion 192 of the chip 190 (arrow 182). The encrypted image 130 may be verified by decrypting by the secure portion 194 of the chip 190 using the encryption keys injected into the secure portion 194 (arrow 184). In this regard, as noted above, the encryption keys may be associated with, for example, a serial number. Thus, the verification may ensure that the pre-personalization of the encrypted image 130 corresponds to the proper chip 190. The secure portion 194 may then re-encrypt the image for storage to the flash memory 170 (arrow 186). In this regard, the re-encryption by the secure portion 194 may be accomplished using encryption keys that may be generated by the secure portion 194 and that may be unique to each chip.

Since the encryption keys are generated by the secure portion 194 and may be unique to each chip, they may be unknown (or unbreakable) and, therefore, the image 130 may be securely delivered to an external flash memory 170.

Figure 2:
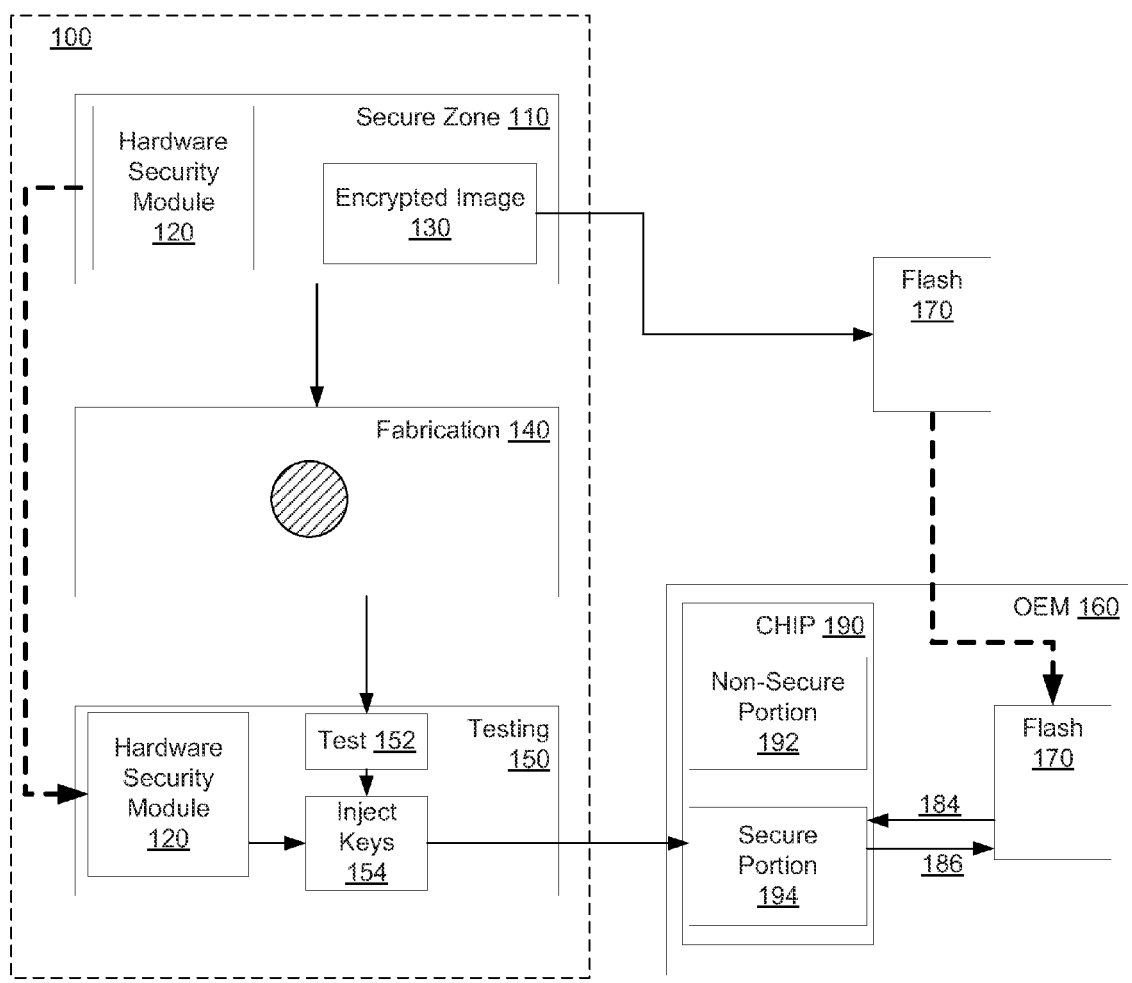
FIG. 2 is an example schematic representation of another manufacturing flow.

In other embodiments, as illustrated in FIG. 2, the encrypted image 130 may be written to a flash memory 170 during, for example, manufacture of the flash memory 170. In this regard, the encrypted image 130 may be delivered to a manufacturer of the flash memory 170 or to a post-manufacturing processor of the flash memory 170. The flash memory 170 with the encrypted image 130 may then be delivered to the OEM 160 for coupling with the chip 190. As with the example of FIG. 1, the secure portion 194 of the chip may decrypt and verify the image 130 (arrow 184) and re-encrypt the image 130 using keys generated by the secure portion 194 (arrow 186).

Figure 3:
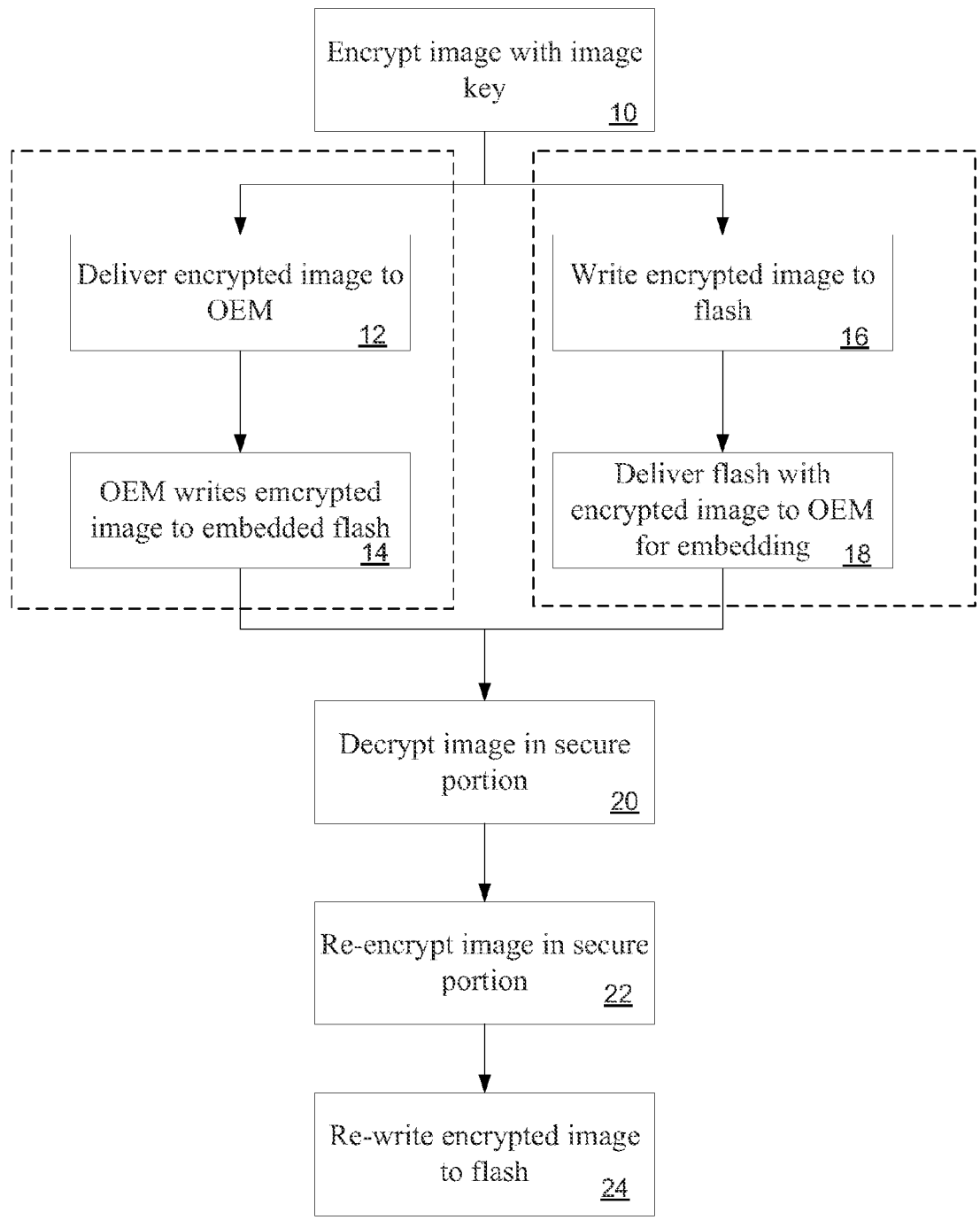
FIG. 3 is a flow chart illustrating an example delivery of secure processing code in the manufacturing flows of FIGS. 1 and 2.

Referring now to FIG. 3, a flow chart illustrates an example delivery of secure processing code in the manufacturing flows of FIGS. 1 and 2. The image may be encrypted with an image key (block 10) at, for example, a secure zone 110. As noted above, any of a variety of encryption techniques may be used to encrypt the image. In one embodiment, the encrypted image is delivered to an OEM (block 12), where it may be written on a flash memory that is embedded in a device (block 14). As noted above, the flash memory may be external to a chip that is delivered to the OEM.

In another embodiment, the encrypted image is written to a flash memory (block 16) during, for example, manufacturing of the flash memory. The flash memory with the encrypted image may then be delivered to the OEM for coupling to a chip (block 18).

At the OEM, the encrypted image may be decrypted in or by a secure portion of the chip (block 20). As noted above, the chip may be provided with the image key used to encrypt the image for verification, for example. The secure portion of the chip may then re-encrypt the image (block 22) for re-writing the encrypted image to the flash memory (block 24). As noted above, the re-encryption of the image may be accomplished using any of a variety of encryption techniques. Further, the encryption keys used for the re-encryption may be generated by the secure portion of the chip to provide additional security.

Figure 4:
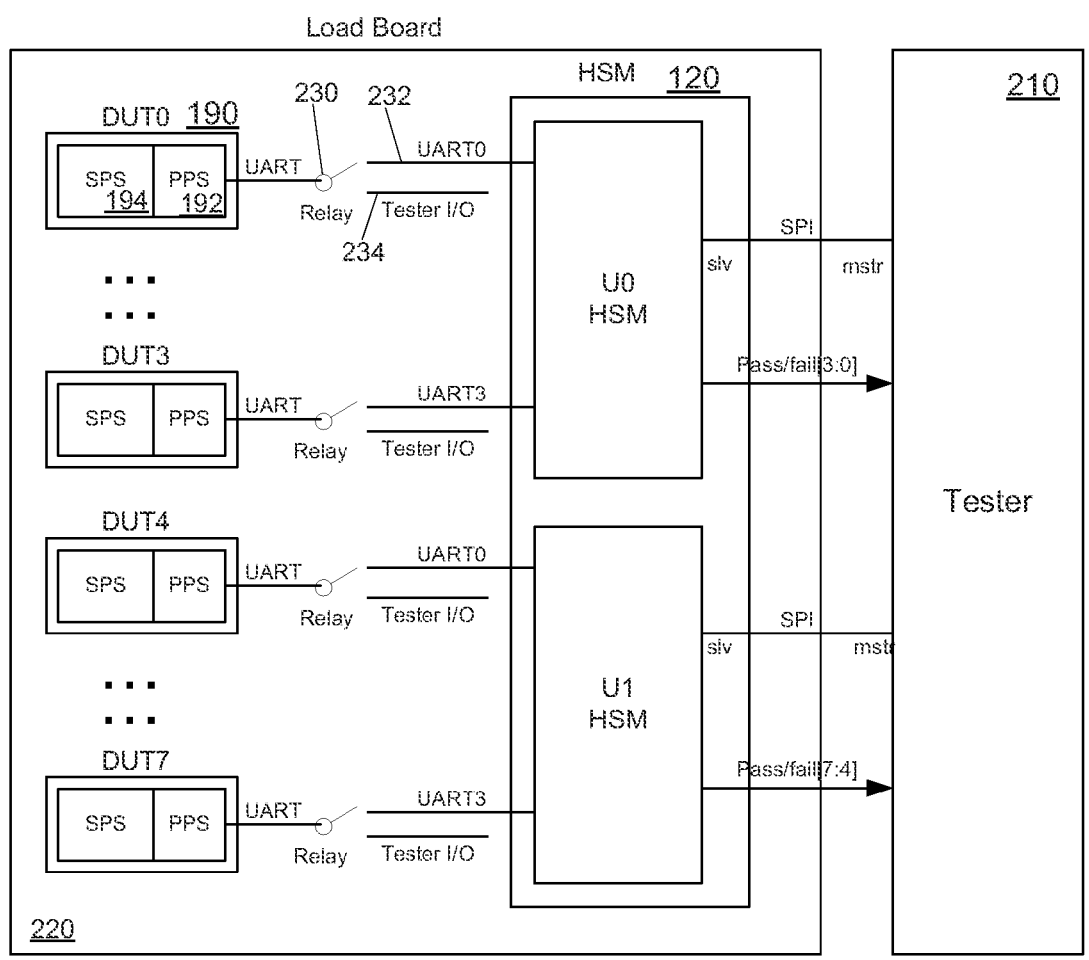
FIG. 4 is an example schematic representation of a testing arrangement.

Referring now to FIG. 4, an example schematic representation of a testing arrangement is illustrated. As described above with reference to FIGS. 1 and 2, the chips or wafers may be delivered from the fabrication facility 140 to a testing facility 150. Such testing facilities may be used to test secure and non-secure devices or portions of devices. Traditional testing may use a test key which may be embedded on the device under test (DUT). In this regard, the test equipment may be required to be placed in a locked cage and may require to be dedicated to testing of secure devices.

Further, it may be difficult to inject keys associated with secure, pre-personalized encrypted image, as described above, in an environment which test both secure and non-secure components.

In various embodiments, sensitive information, such as test keys or keys to be injected into a secure portion, is provided in the HSM 120. Thus, when a load board with one or more DUTs and an HSM 120 is removed from the testing device, all sensitive information is removed from the tester.

Referring again to FIG. 4, the tester 210 is shown connected to a load board 220. The load board 220 includes multiple DUTs, such as the chip 190. As noted above, the chip 190 includes a non-secure portion (PPS) 192 and a secure portion (SPS) 194. The load board 220 further includes an HSM 120, which may further include multiple HSM units each supporting various DUTs.

The tester 210 may test the non-secure portion 192 by commanding the HSM 120 to position a relay 230 to allow direct communication between the tester 210 and the chip 190. In response, the HSM 120 may position the relay 230 to a tester input/output position 234. When the tester 210 wishes the secure portion 194 to be tested (e.g., upon completion of testing of the non-secure portion 192), the tester 210 may command the HSM 120 to switch the relay 230 to an interface 232 between the HSM 120 and the chip 190. The HSM 120 may then establish a secure channel with the secure portion 194 using a test key.

The testing of the secure portion 194 may thus be performed under the control of the HSM 120. During or after successful testing of the secure portion 194, the HSM may inject the necessary keys into the secure portion 194. The HSM 120 may convey the results of the testing of the secure portion 194 to the tester 210 as a simple "pass" or "fail". Thus, the tester may be informed of the testing results without being given any information on the reasons for the results.

Upon completion of the testing, the load board is removed from the tester, which results in removing of all secure information from the tester. For example, the test keys and encryption keys provided in the HSM 120 are isolated from the tester 210.

Likewise, the various diagrams may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, application-specific integrated circuits (ASICs), programmable logic arrays (PLAs), programmable array logic (PALs), complex programmable logic devices (CPLDs), field-programmable gate arrays (FPGAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising a chip, the chip comprising:
a secure processing system and a non-secure processing system, wherein the secure processing system is configured to store a first encryption key in the secure processing system;
an interface to connect an external memory device, and access, in the external memory device, an encrypted data for the apparatus that is stored in the external memory device; and
the secure processing system is configured to:
store a second encryption key in the secure processing system in response to successful completion of a test of the secure processing system, wherein the test is based on the first encryption key;
decrypt the encrypted data accessed on the external memory device using the second encryption key to obtain decrypted data;
generate a third encryption key unique to the chip; and
re-encrypt the decrypted data using the third encryption key to obtain re-encrypted data, wherein the re-encrypted data is used as an operating system of the apparatus.

2. The apparatus of claim 1, wherein, the secure processing system is configured to write the re-encrypted data to the external memory device.

3. The apparatus of claim 1, wherein the secure processing system is configured to write the re-encrypted data to the apparatus.

4. The apparatus of claim 1, wherein the external memory device is a flash memory.

5. The apparatus of claim 1, wherein the interface is a first interface, and the apparatus further comprising:
a second interface configured to connect with a relay, wherein the apparatus is communicably connected to a security device via the relay when the relay is in a secure position.

6. The apparatus of claim 5, wherein
the secure processing system of the chip is enabled for testing by the security device when the relay is in the secure position.

7. The apparatus of claim 6, wherein
the apparatus is communicably connected to a tester device via the relay when the relay is in an unsecure position; and
the non-secure processing system of the chip is enabled for testing by the tester device when the relay is in the unsecure position.

8. A method, comprising:
receiving and storing, by a test device, a first encryption key in a secure portion of the test device;
receiving and storing, by the test device, in response to successful completion of testing of the secure portion of the test device using the first encryption key, a second encryption key in the secure portion of the test device;
receiving and storing, by the test device, in the secure portion of the test device, an encrypted processing code customized for the test device;
decrypting, by the test device, the encrypted processing code using the second encryption key to obtain decrypted processing code:
generating, by the test device, a third encryption key;
re-encrypting the decrypted processing code, by the test device, using the third encryption key to obtain a re-encrypted processing code; and
storing the re-encrypted processing code in the test device.

9. The method of claim 8, wherein the encrypted processing code is received from a memory device that is external to the test device.

10. The method of claim 8, wherein the second encryption key is unique to the test device.

11. The method of claim 8, further comprising:
storing the re-encrypted processing code to a memory device that is included in the test device.

12. A non-transitory computer readable storage medium comprising instructions executable by a processor, the non-transitory computer readable storage medium comprising:
instructions to test an unsecure portion of a chip;
instructions to test a secure portion of the chip, in response to successful test of the unsecure portion;
instructions to store a first encryption key in the secure portion, in response to successful test of the secure portion;
instructions to decrypt encrypted data stored on a memory device by the secure portion using the first encryption key to obtain decrypted data;
instructions to generate a second encryption key by the secure portion;
instructions to re-encrypt the decrypted data using the second encryption key to obtain a re-encrypted data; and
instructions to store the re-encrypted data in the chip.

13. The non-transitory computer readable storage medium of claim 12, wherein the second encryption key is associated with an identifier of the chip.

14. The non-transitory computer readable storage medium of claim 13, wherein the identifier is associated with a serial number of the chip.

15. The non-transitory computer readable storage medium of claim 13, wherein the identifier is associated with a group of serial numbers of chips.

16. The non-transitory computer readable storage medium of claim 12, further comprising:
instructions to store the re-encrypted data to the memory device; and
instructions to couple the memory device to the chip, the re-encrypted data comprising an operating system for the chip.

17. The non-transitory computer readable storage medium of claim 12, further comprising:
instructions to receive and store a test encryption key in the secure portion of the chip, wherein the secure portion is tested using the test encryption key.

18. The method of claim 8, further comprising:
loading the test device to a test board for said testing, the test board comprising a relay configurable in either a secure communication position or an unsecure communication position;
establishing, by the test device, a communication path to the relay; and
receiving testing of an unsecure portion of the test device with the relay while the relay is in the unsecure communication position.

19. The method of claim 18, further comprising:
in response to successfully testing the unsecure portion, testing of the secure portion of the test device using the first encryption key with the relay set to the secure communication position.

20. The method of claim 19, wherein the secure portion of the test device is tested by a first device and the unsecure portion of the test device is tested by a second device, and the test device receives the second encryption key from the first device in response to successful testing of the secure portion.

* * * * *